United States Patent

Kennedy

[15] 3,635,670
[45] Jan. 18, 1972

[54] RECOVERY OF DILUTE CAUSTIC SODA SOLUTIONS FROM SPENT LIQUORS CONTAINING HEMICELLULOSE

[72] Inventor: David K. Kennedy, Clay, N.Y.
[73] Assignee: Allied Chemical Corporation, New York, N.Y.
[22] Filed: June 11, 1969
[21] Appl. No.: 832,234

[52] U.S. Cl. ................................23/185, 23/49, 23/184, 162/29, 162/38
[51] Int. Cl. ..............................C01d 1/00, D21c 11/00
[58] Field of Search ..................23/185, 184, 49; 162/29, 36

[56] References Cited

UNITED STATES PATENTS

| | | |
|---|---|---|
| 1,005,882 | 10/1911 | Rinman ........................................23/49 |
| 1,606,338 | 11/1926 | Bradley et al. ...............................23/49 |
| 2,337,262 | 12/1943 | McOmie et al. ..........................23/185 X |
| 2,618,610 | 11/1952 | Thomsen ..................................162/36 |

Primary Examiner—Oscar R. Vertiz
Assistant Examiner—G. Alvaro
Attorney—Birgit E. Morris and Gerard P. Rooney

[57] ABSTRACT

Caustic spent liquor, from the processing of pulp material such as wood and cotton pulp in the purification of cellulose, may contain up to 10 percent caustic soda along with significant amounts of both inorganic salts and organic matter made up of hemicellulose, pentosans, hexosans, galactans, and the like, which are extracted from the pulp by the action of the caustic solution.

7 Claims, 1 Drawing Figure

PATENTED JAN 18 1972
3,635,670
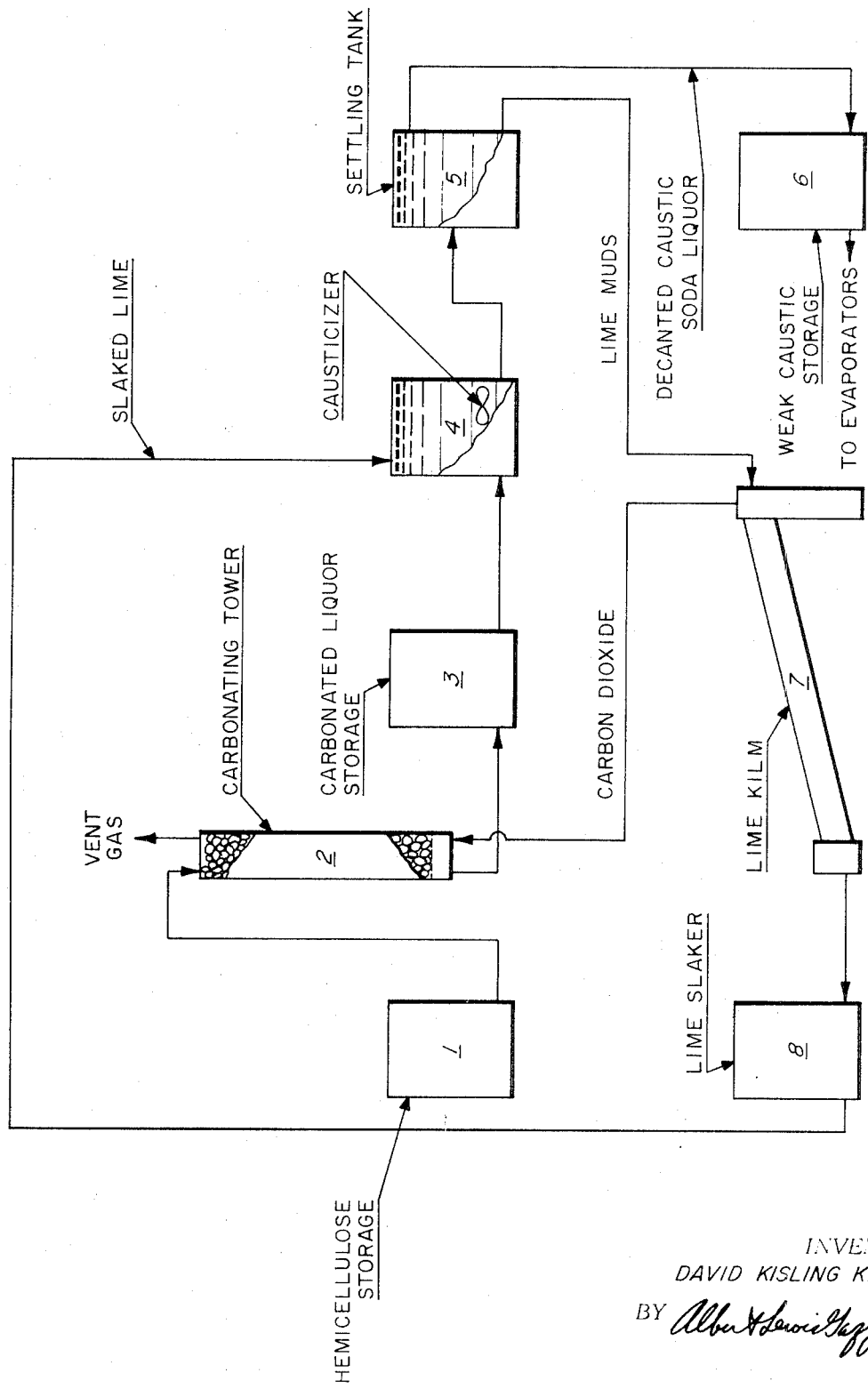
INVENTOR.
DAVID KISLING KENNEDY
BY Albert Lewis Gazzole
AGENT

RECOVERY OF DILUTE CAUSTIC SODA SOLUTIONS FROM SPENT LIQUORS CONTAINING HEMICELLULOSE

The recovery of the caustic soda from the spent caustic liquor containing organic matter, has not been heretofore economically feasible because of the high cost of processing.

An economical unitary process for the recovery of purified reusable caustic solution from the spent caustic liquor containing organic matter, is herein described. The relatively pure caustic solution is recovered after carbonation, wherein the pH is dropped from over 12 to about 7.5–10.5, followed by causticization of the spent liquor with an excess of lime, as calcium oxide or calcium hydroxide, to precipitate the bulk of impurities therefrom. The entire process is carried out without resorting to inordinate conditions such as excessive high temperatures of well over 100° C. and superatmospheric pressures of the prior art methods for removing organic contaminants from spent caustic liquor, which add to the expense of recovery. In organic impurities are coprecipitated, as carbonates and bicarbonates, along with the hemicellulose and other organic matter.

BACKGROUND OF THE invention

Cellulosic pulp material is normally processed by treating with a 17–18 percent caustic soda solution to extract nonalpha-cellulose materials therefrom. The extraction of these organic materials leads to a product containing about 94 percent alpha-cellulose. The nonalpha-cellulose organic impurities extracted from the pulp consist mostly of hemicellulose and minor amounts of pentosans, hexosans, galactans, and the like. These organic impurities as well as inorganic matter such as sodium salts, are extracted by the process.

The problem of recovering reusable caustic soda solution from spent liquor containing significant quantities of organic matter by an efficient and economical method, had not been solved before this invention.

Because of inherent expensive operating cost and tedious procedures, the known methods of recovery, such as dialysis, evaporation, oxidation at high temperatures and pressures (sometimes as high as 372° C. and 2,000 p.s.i.) addition of expensive precipitators, and the like have not been found practical.

For instance, U.S. Pat. No. 2,774,666, offers a process of oxidation utilizing a liquid phase oxidation reactor at temperatures between 150°–372° C. and preferably about 225° C., and pressures of 400 p.s.i. or more, for the conversion of organic matter to carbon dioxide and all of the hydrogen present, to steam. After oxidation, the liquid is treated with lime and the precipitated calcium oxide is separated off and kilned. This process is complicated and expensive, in virtue of the liquid phase oxidation procedure. This latter procedure is effectively omitted in the process of the present invention.

U.S. Pat. No. 2,801,264 discloses the application of a complicated procedure comprising repeated recycling of incomplete reaction products, during the caustic extraction of liquified cellulose, to avoid removing organic matter by incineration.

U.S. Pat. No. 2,980,501 describes the concentration of spent liquor by evaporation and subsequent treatment with chlorine and heat to flocculate suspended and colloidal matter. The floc is finally skimmed off leaving the caustic soda solution for recycling.

Nowhere in the prior art is found a method which includes a unitary procedure of controlled carbonation and causticizing to remove organic impurities from spent liquors, without resorting to high temperatures of well over 100° C. and pressures higher than atmospheric pressure, or expensive chemicals and equipment.

SUMMARY OF THE INVENTION

By the process of the present invention, spent caustic waste from alpha-cellulose purification are processed to remove organic impurities, such as hemicellulose, by treating the spent liquor having a pH of over 12, first with a carbon dioxide containing material to reduce the pH within the range of 7.5–10.5 and preferably about 9–10, and secondly with lime, hereinafter defined to include either calcium oxide and/or calcium hydroxide, to precipitate the bulk of the organic and other impurities and regenerate the caustic soda. This unitary controlled carbonation and causticizing procedure is simple and effective, in the regeneration of caustic spent-liquor-containing organic impurities to caustic soda solution.

DETAILED DESCRIPTION OF THE INVENTION

In the practice of the present invention the spent caustic liquor is treated with a carbon dioxide or a carbon dioxide containing material, such as flue gas or kiln gas, to adjust the pH within the above range, and preferably to about 9.0–10.0.

The carbon dioxide may be added by simply bubbling the gas stream through the body of spent caustic liquor. Alternatively, more effective contact between the spent liquor and carbon dioxide may be achieved by flowing the liquor down through the top of a packed vessel or column, countercurrent to an upwardly rising stream of carbon dioxide, at room temperature and atmospheric pressure.

What is precipitated during this carbonation step is not known, but the fact remains that by controlling this carbonation step within the above pH range, optimum precipitation of organic impurities occurs in the subsequent causticization step. Although there may be some precipitation of hemicellulose during this carbonation step, the precipitation is far from complete and is difficult to separate from the liquor at this point. Lowering the pH substantially below 7.5 tends to increase the precipitate but does not enhance its separation from the liquor. When the pH is substantially more than 10.5, insufficient carbonation occurs and subsequent inadequate precipitation of impurities in the subsequent causticizing step results.

Increasing the temperature during this controlled carbonation step does not appear to enhance the separation.

Following carbonation, the spent liquor is treated with an excess of lime, sufficient to precipitate the bulk of impurities as carbonates and convert the carbonated liquor to caustic soda. The quantity of lime added is dependent upon the concentration of carbonates. To insure complete precipitation a portion of the supernatent may be treated with a little lime. If precipitation occurs, more lime is added to the bulk until no further precipitation is observed. Although this step may be carried out at room temperature, elevated temperatures of up to 90° C. are sometimes beneficial to insure complete reaction and are preferred. Temperatures of over about 90° C., however, increase the cost of processing without any subsequent improvement to the process.

After the lime treatment, the caustic soda liquor is separated from the precipitated muds, by conventional separation means such as decanting or by filtration. The recovered caustic soda may thereafter be fortified with strong caustic, or evaporated to a concentration usable for future pulp purification, or for other uses. The lime muds are further washed to recover any additional caustic soda and then the muds may be burned in a conventional manner to yield primarily water, carbon dioxide and burned lime. Both the carbon dioxide and lime may be reusable for above processing of caustic spent liquor.

Referring to the attached Flow Sheet, one embodiment of the present invention may be described as follows:

The caustic spent liquor containing hemicellulose is collected in Storage Tank 1 and passed through a Carbonating Tower 2 in which the carbon dioxide flows countercurrent until sufficient carbonation occurs to reduce the pH of the spent liquor from over 12 to about 7.5–10.5, and the thus carbonated liquor is stored in a Liquor Storage Tank 3. It is thereafter transferred to a Causticizing Tank 4 and treated with an excess of lime, agitating during the treatment so as to insure complete conversion of the bulk of sodium carbonate to sodium hydroxide. The causticized liquor is allowed to settle in tank 5 until the precipitated carbonates settle. The supernatent is then decanted and transferred to Storage Tank 6 where it is stored for future use. The lime muds, after washing with water to remove residual regenerated caustic soda, are transferred to the Kiln 7 and kilned, thus generating carbon dioxide for use in the Carbonating Tower 2 and calcium oxide which is stored in a Lime Slaker 8, for reuse in the above causticizing step.

The inventive process may be carried out at room temperature and atmospheric pressure. Temperatures may be increased to insure complete reaction and to increase yields, but they need never be so high as those of the prior art methods for removing organic materials from spent liquors.

The following examples are included to illustrate specific embodiments of this invention and are not intended to limit the scope thereof:

EXAMPLE I

One liter of a spent caustic waste liquor containing about 80 grams of sodium hydroxide, and 1.03 percent hemicellulose, obtained after purification of wood pulp in a conventional procedure and having a pH of over 12, was first partially carbonated until a pH of 8.5 was attained. To this was added gradually, 80 grams of calcium hydroxide (an excess) to ensure not only conversion of sodium carbonate to caustic soda but maximum precipitation of hemicellulose. The mixture was filtered. The filtrate was found to contain 8.0 percent caustic soda and reduced in organic content to 0.23 percent, as cellulose.

EXAMPLE II

Another portion of waste liquor was treated in a manner identical with that of example I except that carbonation pH value was 9.7 and resultant cellulose residual in the regenerated alkali was 0.4 percent.

Further tests indicated conclusively that neither carbonation nor causticizing techniques alone, even with filtration, produced a filtrate with substantial reduction in organic content.

I claim:

1. The process for recovering purified caustic soda solution from spent liquor obtained from alpha-cellulose purification having a pH of over 12 and containing hemicellulose by the steps comprising:
    a. carbonating said spent liquor with a carbon dioxide containing gas selected from the group consisting of carbon dioxide, flue gas and kiln gas in an amount sufficient to reduce to pH to between 7.5 and 10.5,
    b. causticizing said carbonated spent liquor with lime in an amount sufficient to precipitate impurities therefrom and convert said carbonated liquor to caustic soda, and
    c. separating the purified caustic soda solution from the precipitate, said controlled carbonation and causticization being conducted at temperatures of about room temperature to about 90° C. and at substantially atmospheric pressures.

2. A process as in claim 1 wherein the gas in step (a) is flue gas.

3. A process as in claim 1 wherein under step (a) the pH is between 9.0–10.0.

4. A process as in claim 1 wherein under step (a) the spent liquor is passed through a carbonating tower in which the carbon dioxide containing gas countercurrently flows.

5. A process as in claim 1 wherein under step (a) the carbon dioxide containing gas is bubbled through the spent liquor.

6. A process as in claim 1 wherein under step (b) the temperature is about 90° C.

7. A process as in claim 1 wherein under step (a) the temperature is about room temperature.

* * * * *